US010013762B2

(12) United States Patent
Hilsebecher et al.

(10) Patent No.: US 10,013,762 B2
(45) Date of Patent: Jul. 3, 2018

(54) METHOD AND CONTROL UNIT FOR DETECTING A CHANGE OF A RELATIVE YAW ANGLE WITHIN A STEREO-VIDEO SYSTEM FOR A VEHICLE

(71) Applicant: Robert Bosch GmbH, Stuttgart (DE)

(72) Inventors: Joerg Hilsebecher, Oldenburg (DE); Bastian Meyer, Hameln (DE)

(73) Assignee: ROBERT BOSCH GMBH, Stuttgart (DE)

( * ) Notice: Subject to any disclaimer, the term of this patent is extended or adjusted under 35 U.S.C. 154(b) by 176 days.

(21) Appl. No.: 15/112,296

(22) PCT Filed: Dec. 2, 2014

(86) PCT No.: PCT/EP2014/076281
§ 371 (c)(1),
(2) Date: Jul. 18, 2016

(87) PCT Pub. No.: WO2015/110207
PCT Pub. Date: Jul. 30, 2015

(65) Prior Publication Data
US 2016/0335755 A1 Nov. 17, 2016

(30) Foreign Application Priority Data
Jan. 24, 2014 (DE) .......................... 10 2014 201 271

(51) Int. Cl.
*H04N 13/00* (2018.01)
*H04N 17/00* (2006.01)
(Continued)

(52) U.S. Cl.
CPC ................ *G06T 7/002* (2013.01); *G06T 7/85* (2017.01); *H04N 5/23296* (2013.01);
(Continued)

(58) Field of Classification Search
CPC .......... H04N 5/23296; H04N 13/0239; H04N 13/0246; H04N 17/002; H04N 2013/0074;
(Continued)

(56) References Cited

U.S. PATENT DOCUMENTS

2016/0001780 A1* 1/2016 Lee .................... G06K 9/00791
348/46

FOREIGN PATENT DOCUMENTS

DE 102004062275 7/2006
JP 2007263669 A 10/2007

OTHER PUBLICATIONS

Thao Dang et al., Self calibration for active automotive stereo vision, 2006 IEE Intelligent Vehicles Symposium, Jun. 13, 2006, 364-369, Meguro-Ku, Japan.
(Continued)

*Primary Examiner* — Sherrie Hsia
(74) *Attorney, Agent, or Firm* — Norton Rose Fulbright US LLP; Gerard Messina

(57) ABSTRACT

A method for recognizing a change of a relative yaw angle at a stereo video system for a vehicle. An image pair is read in from first and second cameras at a first time, and a further image is read in from the first camera at a later time. A stationary surface is ascertained using the image pair and the stereo base to obtain an angle of inclination of the stereo video system. The stationary surface is determined using the first image of the image pair and the further image to obtain a comparison angle. A correspondence transformation between the first image and the further image is acquired if the stereo video system has moved by a distance between the first time and the further time. The angle of inclination is compared with the comparison angle to recognize the change of the relative yaw angle.

10 Claims, 2 Drawing Sheets

(51) Int. Cl.
   *H04N 5/232*   (2006.01)
   *G06T 7/00*    (2017.01)
   *H04N 13/02*   (2006.01)
   *G06T 7/80*    (2017.01)

(52) U.S. Cl.
   CPC ..... *H04N 13/0239* (2013.01); *H04N 13/0246* (2013.01); *H04N 17/002* (2013.01); *G06T 2200/04* (2013.01); *G06T 2207/10021* (2013.01); *G06T 2207/30252* (2013.01); *H04N 2013/0074* (2013.01)

(58) Field of Classification Search
   CPC .... H04N 13/0203; H04N 13/00; H04N 13/02; H04N 17/00; H04N 5/232; G06T 7/002; G06T 7/85; G06T 2200/04; G06T 2207/10021; G06T 2207/30252
   USPC ......... 348/46, 42, 47, 139, 187; 701/41, 300
   See application file for complete search history.

(56) References Cited

OTHER PUBLICATIONS

Horn et al., Determining optical flow, Artificial intelligence Elsevier Science, Jan. 8, 1981, 185-203, Amsterdam.
Masafumi Nakagawa et al., A stereo self-adjusting methodology for resuming active camera operation, Symposium on advances in image and video technology, Jan. 13, 2009, 680-691, Berlin Heidelberg.
Morat et al., Evaluation method for automotive stereo-vision systems, 2007 IEE Intelligent vehicle symposium, Jun. 1, 2007, 202-208.
International Search Report dated Feb. 3, 2015, of the corresponding International Application PCT/EP2014/076281 filed Oct. 10, 2015, 2 pages.

\* cited by examiner

METHOD AND CONTROL UNIT FOR DETECTING A CHANGE OF A RELATIVE YAW ANGLE WITHIN A STEREO-VIDEO SYSTEM FOR A VEHICLE

FIELD

The present invention relates to a method for recognizing a change in a relative yaw angle at a stereo video system for a vehicle or some other moving system, to a corresponding control device, and to a corresponding computer program product.

BACKGROUND INFORMATION

In a stereo camera, small changes in the angle between the cameras already have an effect on the precision of the overall system.

German Patent Application No. DE 10 2004 062 275 A1 describes a method and a device for ascertaining a calibration of the stereo camera.

SUMMARY

Against this background, the present invention provides a method for recognizing a change in the relative yaw angle at a stereo video system for a vehicle, and a control device that uses this method, as well as, finally, a corresponding computer program product, according to the main claims. Advantageous embodiments are described herein.

A spatial recognition of objects based on stereoscopy has a high recognition probability and a high recognition speed. The stereoscopy also functions when the stereo camera system is at rest. The stereoscopy is only susceptible to changes of a relative orientation of the two cameras. Due for example to the effect of heat or cold, one of the cameras can become slightly rotated relative to the other camera. A first reference point of the first camera then has an incorrect translocation relative to a second reference point of the second camera, the first and second reference point representing the same point in a recording region of the camera. Due to this translocation, distances to recognized objects are incorrectly ascertained. Flat objects are perceived as tilted. In order to compensate the angular error, at least one of the reference points can be adapted.

Based on a monocular evaluation of temporally and spatially offset images of one of the cameras, objects can also be spatially resolved. The spatial distance between the images works similarly to a stereo base between the cameras in the case of stereoscopy. Between the images, a correspondence transformation can then be determined that represents a modification between the images. In contrast to stereoscopy, the monocular evaluation cannot have sensitivity to a relative angular error between two cameras.

Thus, stereoscopy using two cameras can be secured through the monocular evaluation of one of the cameras via the correspondence transformation.

In particular, flat, stationary objects can be used to compensate the angular error by compensating the angle in such a way that the acquired objects are identically measured using both measurement methods (stereoscopic, monoscopic).

A method is presented for recognizing a change in a relative yaw angle at a stereo video system for a vehicle, the stereo video system having a first camera and a second camera that are oriented to a common acquisition region and are configured offset to one another by a stereo base, the method including:

reading in of an image pair by the cameras and of a further image by the first camera, the image pair including a first image of the first camera, acquired at a first time, and a second image of the second camera, acquired at the first time, and the further image being acquired at a further time temporally offset to the first time;

ascertaining of a secondary surface in the region of acquisition (a ground surface is in particular advantageous) using the image pair, the stereo base, and a stereoscopy processing rule in order to obtain an angle of inclination, preferably a pitch angle relative to the stationary surface, of the stereo video system;

determining the stationary surface using the first image of the image pair, the further image, and a correspondence transformation processing rule in order to obtain a comparison angle, a correspondence transformation being acquired between the first image and the further image if the stereo video system has moved by a distance between the first time and the further time; and comparison of the angle of inclination to the comparison angle, i.e., the two surface inclinations, using a comparison rule, in order to recognize the change in the relative yaw angle.

A change in the relative yaw angle, also called a yaw angle offset, can be understood as a difference in lateral directional angles of the two cameras. A stereo base can be a spatial distance of the cameras. An image can be represented by an item of information concerning image points configured in lines and in rows. A stationary surface can be a roadway surface and can move relative to the vehicle. A stereoscopy processing rule can represent a triangulation. A correspondence transformation processing rule can be used to produce a vector field of the correspondence transformation, for example of the optical flux, between two images. Here, the angle of inclination is the angle spanned between a plane ascertained by the stereo video system and a reference plane. The angle of inclination is thus not equal to zero when the ascertained plane and the reference plane do not coincide. Both the ascertained plane and the reference plane are virtual planes ascertained on the basis of the stationary plane and two different processing rules.

At least one additional image pair can be read in, the additional image pair being acquired temporally offset to the image pair. A further angle of inclination can be ascertained using the further image pair. The method can have a step of motion recognition in which the angle of inclination is compared to the further angle of inclination in order to recognize a pitching movement of the stereo video system. If the stereo video system fastened to the vehicle executes a pitching movement due to a movement of the vehicle itself, an angle of view of the camera to the stationary surface changes. The resulting change in the recognized angle of inclination is not however a decalibration. Through movement recognition, false conclusions concerning the change in the relative yaw angle can be avoided.

The further image can be read in as a component of the further image pair. Through multiple use of images or image information, computing and storage capacity used can be reduced.

The step of comparison can be carried out if the pitching movement, which here and in the following relates not only to a ground surface but to a translation of the observed stationary surface (e.g., through pitching or steering movements), is less than a threshold value. If the pitching movement is less than the threshold value, a misrecognition of the change of the relative yaw angle can be avoided.

The comparison angle can be determined using the pitching movement. The pitching movement can be taken into account in the recognition of the comparison angle. The stereo video system can then be calibrated even when the vehicle is moving.

The method can have a step of recalibration of the stereo video system, the relative yaw angle of the camera being recalibrated using the change of the relative yaw angle when the change of the relative yaw angle is greater than a tolerance value. A reference point of one of the cameras can be adapted. Likewise, the reference points of both cameras can be adapted. A reference point can be a reference coordinate origin of the respective camera. The reference point can agree with an image point coordinate of the respective camera. Through the recalibration, the stereo video system can be kept calibrated permanently, even if the cameras are physically rotated relative to one another due to external influences. Up to a certain degree, an error that has arisen in the distance of the cameras can also be compensated with a change of the yaw angle.

The recalibration can take place step-by-step, the individual yaw angles each being corrected maximally by a prespecified angle in order to recalibrate the stereo video system. Through a limitation of the angular step during calibration, overshooting in the calibration can be avoided. Through the limitation, the stereo video system can be brought to the desired state step-by-step.

In the step of determining, flux vectors between the first image and the further image can be determined column-by-column or line-by-line in order to find the stationary surface and to determine the comparison angle. Through the line-by-line or column-by-column search of the stationary surface, the method can be carried out quickly with low computing power.

In addition, a control device is provided for recognizing a change of a relative yaw angle at a stereo video system for a vehicle, the stereo video system having a first camera and a second camera that are oriented to a common region of acquisition and are offset to one another by a stereo base, the control device having the following features:

a device for reading in an image pair from the cameras and a further image from the first camera, the image pair including a first image of the first camera acquired at a first time and a second image of the second camera acquired at the first time, and the further image being acquired at a further time temporally offset from the first time;

a device for ascertaining a stationary surface in the region of acquisition using the image pair, the stereo base, and a stereoscopy processing rule in order to obtain an angle of inclination of the stereo video system;

a device for determining the stationary surface using the first image of the image pair, the further image, and a correspondence transformation processing rule in order to obtain a comparison angle, a correspondence transformation between the first image and the further image being acquired if the stereo video system has moved by a distance between the first time and the further time; and a device for comparing the angle of inclination with the comparison angle using a comparison rule in order to recognize the change of the relative yaw angle.

Through this variant embodiment as well of the present invention in the form of a control device, the object underlying the present invention may be achieved quickly and efficiently.

In the present context, a control device can be understood as an electrical device that processes sensor signals and, as a function thereof, outputs control signals and/or data signals. The control device can have an interface that can be fashioned as hardware and/or as software. In the case of a realization as hardware, the interfaces can for example be part of a so-called system ASIC containing a wide variety of functions of the control device. However, it is also possible for the interfaces to be separate integrated circuits, or to be made up at least partly of discrete components. In the case of a realization as software, the interfaces can be software modules present for example on a microcontroller alongside other software modules.

Also advantageous is a computer program product having program code that can be stored on a machine-readable carrier such as a semiconductor memory, a hard drive memory, or an optical memory, and that is used to execute the method according to one of the specific embodiments described above when the program product is executed on a computer or a device.

The term "change of the relative yaw angle," as well as the partly used designation "yaw angle offset," relate to a relative angle between main directions of view of two cameras in a stereo video system. The named optical flux is only one variant for determining the second surface inclination. Other correspondence methods are also possible here (e.g., a homography determination). The core of the algorithm is made up of the determination of surface inclinations (advantageous: ground surface) with two different methods (spatial, temporal). In general, the method can also be used for more than two cameras. For the mono-camera path, the method using angle estimation via vanishing point determination can be another advantageous embodiment.

In the following, the present invention is explained in more detail in relation to examples on the basis of the figures.

DETAILED DESCRIPTION OF EXAMPLE EMBODIMENTS

Figure 1:
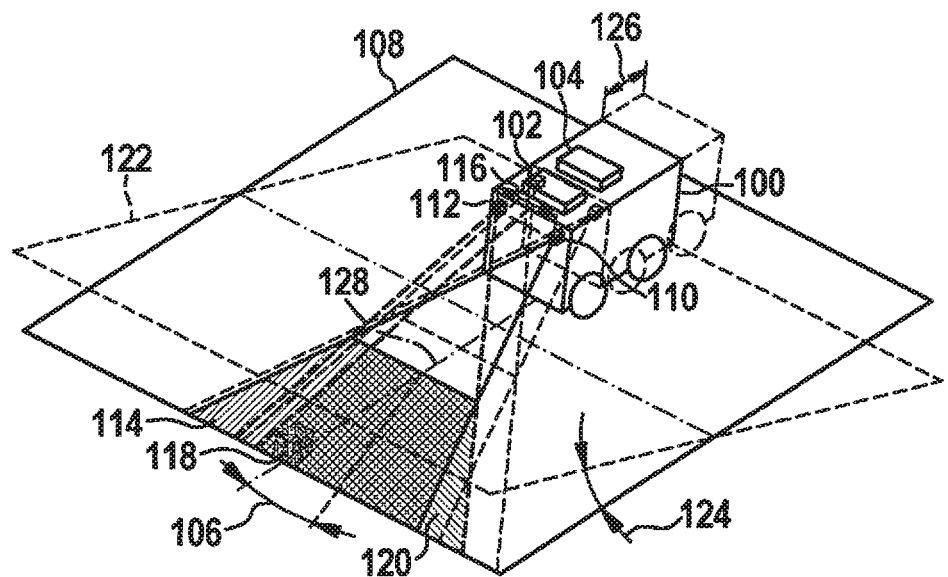
FIG. 1 shows a representation of a vehicle having a stereo video system and a control device for recognizing a change of the relative yaw angle according to an exemplary embodiment of the present invention.

In the following description of advantageous exemplary embodiments of the present invention, identical or similar reference characters are used for elements shown in the various Figures and having similar functions, and repeated description of these elements is omitted.

FIG. 1 shows a representation of a vehicle 100 having a stereo video system 102 and a control device 104 for recognizing a change of the relative yaw angle 106, also called yaw angle offset, according to an exemplary embodiment of the present invention. Control device 104 can be part of stereo video system 102, or can be realized as a separate device.

Vehicle 100 is moving forward on a flat surface 108. Stereo video system 102 has a first camera 110 and a second camera 112. Cameras 110, 112 are oriented toward a common region of acquisition 114 in front of vehicle 100 in the direction of travel. First camera 110 is situated at left in vehicle 100. Second camera 112 is situated at right in vehicle 100. Cameras 110, 112 have a distance 116 from one another. Distance 116 can be designated stereo base 116. Stereo video system 102 is fashioned to spatially acquire objects 118 in region of acquisition 114, using stereo base 116 and stereoscopy, and for example to provide positions of objects 118 relative to vehicle 100 for safety and comfort functions of vehicle 100.

If an object 118, stationary for simplicity, in region of acquisition 114 is acquired by both cameras 114, then in both camera images image points assigned to object 118 are classified as object 118. Coordinates of the image points yield, respectively, a height angle and a side angle from the respective camera 110, 112 to object 118.

A distance of object 118 from vehicle 100 is calculated through triangulation using the known stereo base 116.

Here, one of the cameras 112 is rotated, relative to an initial position, by the change of relative yaw angle 106 shown here as an example. From this there result incorrect height angles and/or side angles in the image points, because rotated camera 112 has a shifted region of acquisition 120. In the image points of shifted region of acquisition 120, object 118 is laterally offset relative to unshifted region of acquisition 114. The distance of object 118 from vehicle 100 is now wrongly calculated.

If surface 108 is acquired by decalibrated cameras 110, 112, then, due to the change of relative yaw angle 106, surface 108 is recognized as inclined surface 122, which does not exist in that form. Inclined surface 122 is purely virtual. Inclined surface 122 spans an angle of inclination 124 relative to flat surface 108.

Control device 104 is fashioned to read in a further camera image, in the present exemplary embodiment from left camera 110. In this exemplary embodiment, the further camera image was recorded when vehicle 100 was further back by a distance 126. The further camera image can also be read in after vehicle 100 has traveled a further distance. When object 118 is acquired in the further camera image, its image coordinates are then shifted by an amount corresponding to distance 126 between the further image and the current camera image. This amount can be expressed as a vector having a magnitude and a direction. The vector can be designated as optical flux.

Because a single camera cannot have any change in the relative yaw angle, surface 108 is recognized without an angle of inclination, i.e., with an angle of inclination equal to zero, when flat surface 108 is acquired in the further image.

Through the approach presented here, the results of the recognition of flat surface 108 are combined. The recognition of surface 108 in stereo video system 102 is thus secured by the optical flux. If the change of the relative yaw angle 106 is recognized, then cameras 110, 112 can be recalibrated until surface 108 is recognized without angle of inclination 124 in stereo video system 102 as well. Stereo video system 102 can be calibrated by adapting a yaw angle reference in one or both camera images.

The use of intermediate results that are already present saves resources. For example, the optical flux, the disparity, and roadway surface 108 are already required for the object detection, and are implemented and callable on the current stereo video control devices 102 (partly in FPGA hardware).

Ascertained roadway surface 122 on the basis of stereo video camera system 102 can be plausibilized with corresponding data from the optical flux.

Roadway surface 108 can be determined from the optical flux without requiring a complete implementation of SfM (structure from motion), in which three-dimensional structures can be determined from two-dimensional image sequences. For this purpose, roadway surface 108 can be calculated incrementally column-by-column. For each column, beginning in the lowest line of the image, all flux vectors are collected that belong to roadway surface 108. Subsequently, the optimal angle of inclination of roadway 108 is determined with a statistical estimation method. This approach is linear and is optimized for a control device 104.

Figure 2:
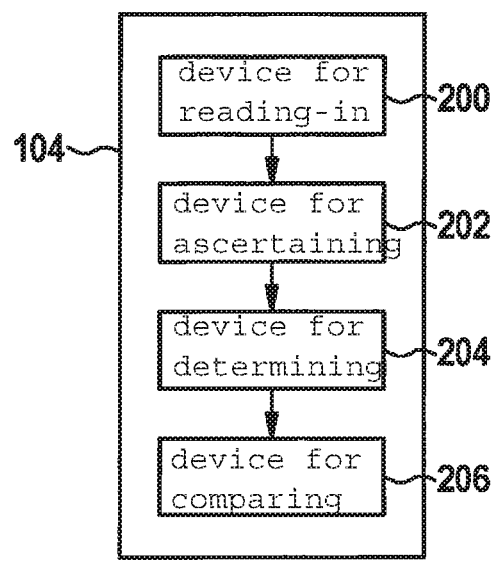
FIG. 2 shows a block diagram of a control device for recognizing a change of the relative yaw angle at a stereo video system for a vehicle according to an exemplary embodiment of the present invention.

FIG. 2 shows a block diagram of a control device 104 for recognizing a change of the relative yaw angle at a stereo video system for a vehicle according to an exemplary embodiment of the present invention. Control device 104 can be used in the vehicle of FIG. 1. Control device 104 has a device 200 for reading in, a device 202 for ascertaining, a device 204 for determining, and a device 206 for comparing. As in FIG. 1, the stereo video system has a first camera and a second camera that are oriented toward a common region of acquisition and are configured offset to one another by a stereo base. Device 200 for reading in is fashioned to read in an image pair from the cameras and a further image from the first camera. The image pair includes a first image of the first camera, acquired at a first time, and a second image of the second camera, acquired at the first time. The further image is acquired at a further time temporally offset from the first time. Device 202 for ascertaining is fashioned to ascertain a stationary surface in the region of acquisition using the image pair, the stereo base, and a stereoscopy processing rule, in order to obtain an angle of inclination to the stationary surface in the stereo video system. Device 204 for determining is fashioned to determine the stationary surface using the first image of the image pair, the further image, and a flux processing rule in order to obtain a comparison angle. Here, an optical flux between the first image and the further image is acquired if the stereo video system has moved by a distance between the first time and the further time. Device 206 for comparing is fashioned to compare the angle of inclination with the comparison angle using a comparison rule in order to recognize a change of the relative yaw angle.

In an exemplary embodiment, control device 104 has device 200 for reading in and device 206 for comparing. Device 200 for reading in is fashioned to read in the angle of inclination of the stationary surface from the stereo video system and to read in the comparison angle. Device 206 for comparing is fashioned to compare the angle of inclination with the comparison angle using a comparison rule in order to recognize the change of the relative yaw angle.

Figure 3:
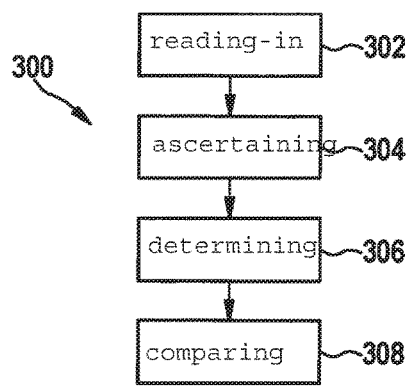
FIG. 3 shows a flow diagram of a method for recognizing a change of the relative yaw angle at a stereo video system for a vehicle according to an exemplary embodiment of the present invention.

FIG. 3 shows a flow diagram of a method 300 for recognizing a change of the relative yaw angle at a stereo video system for a vehicle according to an exemplary embodiment of the present invention. The method can be executed on a control device as shown in FIGS. 1 and 2. Method 300 has a step 302 of reading in, a step 304 of ascertaining, a step 306 of determining, and a step 308 of comparing. The stereo video system has a first camera and a second camera that are oriented toward a common region of acquisition and are configured offset to one another by a stereo base. In step 302 of reading in, an image from the cameras and a further image from the first camera are read in. The image pair includes a first image of the first camera, acquired at a first time, and a second image of the second camera acquired at the first time. The further image is acquired at a further time temporally offset from the first time. In step 304 of ascertaining, a stationary surface in the region of acquisition is ascertained using the image pair, the stereo base, and a stereoscopy processing rule in order to obtain an angle of inclination of the stereo video system to this stationary surface. In step 306 of determining, the stationary surface is determined using the first image of the image pair, the further image, and a flux processing rule, in order to obtain a comparison angle. Here, an optical flux between the first image and the further image is acquired if the stereo video system has moved a distance between the first time and the further time. In step 308 of comparing, the angle of inclination is compared to the comparison angle using a comparison rule in order to recognize the change of the relative yaw angle.

In an exemplary embodiment, in step 302 of reading in at least one further image pair is read in. The further image pair is acquired temporally offset to the image pair. In step 304 of ascertaining, a further angle of inclination is ascertained using the further image pair. The method further has a step of movement recognition in which the angle of inclination is compared with the further angle of inclination in order to recognize a pitching movement of the stereo video system. Through a movement of the stereo video system, an angle of view of the cameras to the region of acquisition changes.

In an exemplary embodiment, in step 302 of reading in the further image is read in as a component of the further image pair. The ascertaining of the angle of inclination takes place cyclically. Here, for the stereoscopy the associated images of the image pairs are used. For the optical flux, images following one another in succession of one of the cameras are used.

In an exemplary embodiment, step 308 of comparison is carried out if the pitching movement is smaller than a threshold value. For example, comparison is carried out if the movement between two successive image pairs is smaller than 5°, in particular smaller than 2°, in particular smaller than 0.5°.

In an exemplary embodiment, in step 306 of determining the comparison angle is determined using the pitching movement. For this purpose, the angle of the pitching movement between two images is taken into account in the calculation of the optical flux between the two images. In the optical flux, the pitching movement acts equally on all vectors of the optical flux. Yaw movements also act equally on all vectors.

In an exemplary embodiment, the method has a step of recalibration of the stereo video system. Here, individual yaw angles of the cameras are recalibrated using the change of the relative yaw angle if the change of the relative yaw angle is greater than a tolerance value. The recalibration takes place mechanically, electronically, and algorithmically, preferably algorithmically. Here, a reference in at least one of the images for the stereoscopy is shifted. At least one of the cameras can also be rotated opposite the change of the relative yaw angle.

In an exemplary embodiment, the recalibration takes place in step-by-step fashion. The individual yaw angles are each corrected by a maximum of a specified angle in order to recalibrate the stereo video system. If the change of the relative yaw angle is greater than the tolerance value, the reference in at least one image is shifted by a predefined step. For example, the reference can be shifted by a predetermined number of image points. Through small steps, a correction angle can be adapted asymptotically to an optimal value.

In an exemplary embodiment, in step 306 of determining, flux vectors between the first image and the further image are determined column-by-column or line-by-line in order to find the stationary surface and to determine the comparison angle. Through the line-by-line or column-by-column evaluation of the flux vectors, a limitation of the stationary surface can easily be found. The found limitation can be used as orientation for the next line or column. In this way, the stationary surface can be found quickly.

In other words, FIG. 3 shows a flow diagram of a method 300 for determining the yaw angle for a decalibrated stereo video camera system on the basis of a stereo surface determination and a mono surface determination.

A roadway plane can be determined using a stereo video camera system. Likewise, on the basis of a moving camera, with the aid of the optical flux, a 3-D reconstruction of the scene can be carried out including the roadway plane (structure from motion, or SfM). Through a combination of these procedures, a decalibration of the stereo video camera system can be recognized and continuously recalibrated using a self-calibration. Previous approaches for continuous self-calibration are either very computing-intensive, or imprecision can occur in the determination of the yaw angle.

The approach presented here describes a calibration of a video system from the combined evaluation of mono and stereo features.

SfM can be used for the determination (e.g., if it is being calculated anyway for other functions); however, it is significantly more efficient to use a column approach (already mentioned above) without making a complete reconstruction on the basis of the optical flux. Purely visually-based SfM approaches cannot estimate the scale of the reconstructed environment. Because in the present case, however, only the angle is required, this is not a problem for the algorithm.

The yaw angle is ascertained between the left and right camera of a camera system that is to be checked and possibly to be decalibrated. The determination of the yaw angle takes place via the comparison between the ascertained roadway surface from the stereo image pairs and the ascertained roadway surface from the optical flux.

In this way there results a more precise determination of the yaw angle than in the case of previous approaches. With the ascertained yaw angle, after a recalibration a more precise distance measurement in the disparity image is possible.

The approach presented here can be implemented in real time on current control device hardware.

Figure 4:
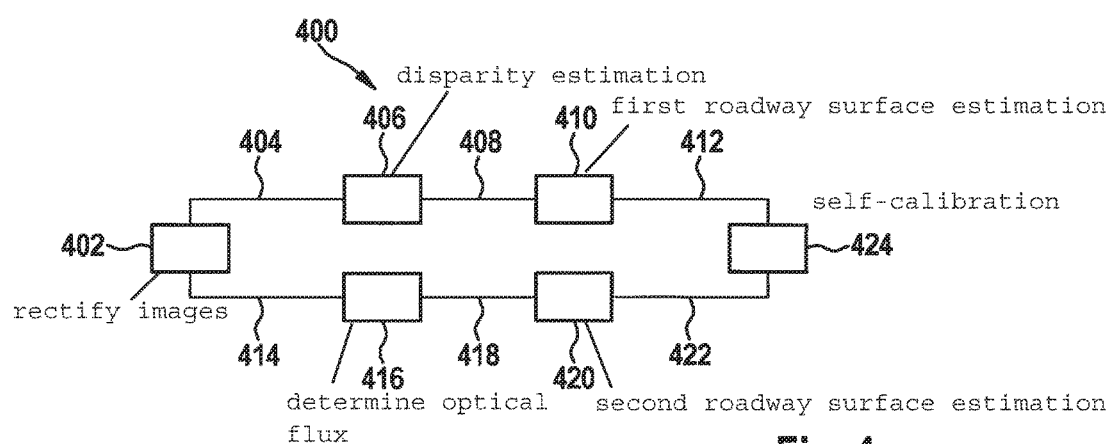
FIG. 4 shows a flow diagram of a sequence of a method for recognizing a change of the relative yaw angle at a stereo video system for a vehicle according to an exemplary embodiment of the present invention.

FIG. 4 shows a flow diagram 400 of a sequence of a method for recognizing a change of the relative yaw angle at a stereo video system for a vehicle according to an exemplary embodiment of the present invention. According to this exemplary embodiment, sequence 400 begins with a rectification 402 of images of the stereo video system. The rectification is not a precondition for the mono path, but only a simplification. In general, the angle of inclination of the surface can also be calculated on non-rectified images. For the stereo path, it is true that a rectification has to take place, but this can also be carried out after the disparity and distance estimation. Rectification 402 provides rectified images. Subsequently, two parallel branches are run through for sequence 400. In the first branch, a rectified stereo image pair 404 of the stereo video system is read in for a disparity estimation 406. In disparity estimation 406, a disparity map 408 of stereo image pair 404 is produced. Disparity map 408 is used in a first roadway surface estimation 410 to ascertain a first position 412 of a plane of the roadway in stereo image pair 404. In the second branch, at least two mono images 414, recorded temporally offset to one another, are read in in order to determine an optical flux 416. As optical flux, two-dimensional flux vectors 418 between mono images 414 are provided. Flux vectors 418 are used by a second roadway surface estimation 420 to ascertain a second position 422 of the plane of the roadway in mono images 414. The two branches of sequence 400 are again joined by comparing first position 412 and second position 422 with one another. If a deviation of the two positions 412, 422 is recognized, there takes place a self-calibration 424 of the stereo video system. Because sequence 400 is carried out continuously, self-calibration 424 is continuous.

The ascertaining of the yaw angle between the left and right camera is a necessary part of the continuous self-calibration of the stereo video camera system.

The calibration is monitored on the basis of a naive approach, such as for example an epipolar condition. A self-calibration of the roll angle and pitch angle is carried out only when a decalibration of the system is recognized.

The remaining yaw angle error is ascertained in several steps. The yaw angle error should indeed be compensated after the compensation of the pitch angle and roll angle, but this is not necessary, because the yaw angle is compensated separately. First, roadway surface 412 is calculated on the basis of the stereo video camera system. From roadway surface calculation 410, the angle of inclination of the plane to the camera system can be determined. This process is repeated for the following stereo image pair 404. Deviations in the angle of inclination indicate for example a forward pitch of the vehicle. Corresponding corrections are taken into account in subsequent steps.

For one of the two images, the optical flow 416 is calculated in the image between the two times. If the camera system has moved between the two times due to travel of the vehicle, roadway surface 422 can be ascertained from the data. From calculated roadway surface 422, the angle of inclination of roadway surface 422 to the camera system is then determined. Calculation 420 of the roadway surface on the basis of optical flux 416 can either take place via a 3-D reconstruction (SfM), or roadway surface 422 is determined, in the manner of a statistical regression, directly from the divergence of flux field 418.

If a forward pitching of the vehicle has been determined, the measured difference between the various angles of inclination from stereo can be taken into account in the further calculation.

In this case, the determination of the camera yaw angle can also be omitted.

For the case in which no forward pitch of the vehicle is present, a necessary correction of the yaw angle between the cameras can easily be determined.

If the angles of inclination of the roadway surface determinations 410, 420 from stereo and from SfM differ, there is a decalibration of the stereo video camera system. The yaw angle of the stereo camera system has a direct influence on the determination 410 of roadway surface 412 of the stereo camera system, and can be ascertained via it.

The stability of the system can be increased by a suitable update strategy. For example, a maximum compensation angle can be determined. In this way, after running through the method several times the yaw angle approaches its optimum step-by-step.

A mechanical decalibration of the stereo video camera system can take place through rotation or through a shifting of a camera. The system is recalibrated if the vehicle is in motion, because the calibration is a function of the optical flux.

The determination of the yaw angle error can be used as a part of the continuous self-calibration of stereo video camera systems.

The exemplary embodiments described and shown in the Figures have been chosen only as examples. Different exemplary embodiments can be combined with one another completely or with regard to individual features. An exemplary embodiment can also be supplemented by features of a further exemplary embodiment.

In addition, method steps according to the present invention can be repeated, and can be executed in a sequence differing from the described sequence.

If an exemplary embodiment includes a "and/or" linkage between a first feature and a second feature, this is to be read as meaning that according to one specific embodiment the exemplary embodiment has both the first feature and the second feature, and according to a further specific embodiment the exemplary embodiment has either only the first feature or only the second feature.

What is claimed is:

1. A method for recognizing a change of a relative yaw angle at a stereo video system for a vehicle, the stereo video system having a first camera and a second camera that are oriented toward a common region of acquisition and are configured offset to one another by a stereo base, the method comprising:
    reading in an image pair from the first camera and the second camera, and a further image from the first camera, the image pair including a first image of the first camera acquired at a first time, and a second image of the second camera acquired at the first time, the further image being acquired at a further time that is temporally offset to the first time;
    ascertaining a stationary surface in the region of acquisition using the image pair, the stereo base, and a stereoscopy processing rule, to obtain an angle of inclination of the stereo video system;
    determining the stationary surface using the first image of the image pair, the further image, and a correspondence transformation processing rule, to obtain a comparison angle, a correspondence transformation between the first image and the further image being acquired if the stereo video system moved by a distance between the first time and the further time; and
    comparing the angle of inclination with the comparison angle using a comparison rule to recognize the change of the relative yaw angle.

2. The method as recited in claim 1, wherein, in the reading in step, at least one further image pair is read in, the further image pair being acquired temporally offset to the image pair, a further angle of inclination being ascertained in the ascertaining step, using the further image pair, and the method further including a step of movement recognition in which the angle of inclination is compared with the further angle of inclination in order to recognize a pitching movement of the stereo video system.

3. The method as recited in claim 2, wherein, in reading in step, the further image is read in as a component of the further image pair.

4. The method as recited in claim 2, wherein the comparing step is carried out if the pitching movement is smaller than a threshold value.

5. The method as recited in claim 2, wherein, in the determining step, the comparison angle is determined using the pitching movement.

6. The method as recited in claim 2, further comprising: recalibrating the stereo video system, including correcting the relative yaw angle of the first and second cameras using the change of the relative yaw angle if the change of the relative yaw angle is greater than a tolerance value.

7. The method as recited in claim 6, wherein the recalibrating takes place step-by-step, individual yaw angles each being corrected by, maximally, a prespecified angle to recalibrate the stereo video system.

8. The method as recited in claim 1, wherein in the determining step, flux vectors between the first image and the further image are determined column-by-column or line-by-line in order to find the stationary surface and to determine the comparison angle.

9. A control device for recognizing a change of a relative yaw angle at a stereo video system for a vehicle, the stereo video system having a first camera and a second camera that are oriented toward a common region of acquisition and are configured offset to one another by a stereo base, the control device comprising:
   a device to read in an image pair from the cameras and a further image from the first camera, the image pair including a first image of the first camera acquired at a first time, and a second image of the second camera acquired at the first time, and the further image being acquired at a further time temporally offset to the first time;
   a device to ascertain a stationary surface in the region of acquisition using the image pair, the stereo base, and a stereoscopy processing rule to obtain an angle of inclination of the stereo video system;
   a device to determine the stationary surface using the first image of the image pair, the further image, and a correspondence transformation processing rule in order to obtain a comparison angle, a correspondence transformation between the first image and the further image being acquired if the stereo video system has moved by a distance between the first time and the further time; and
   a device to compare the angle of inclination with the comparison angle using a comparison rule in order to recognize the change of the relative yaw angle.

10. A non-transitory computer readable storage medium storing program code for recognizing a change of a relative yaw angle at a stereo video system for a vehicle, the stereo video system having a first camera and a second camera that are oriented toward a common region of acquisition and are configured offset to one another by a stereo base, the program code, when executed by a processor, causing the processor to perform:
   reading in an image pair from the first camera and the second camera, and a further image from the first camera, the image pair including a first image of the first camera acquired at a first time, and a second image of the second camera acquired at the first time, the further image being acquired at a further time that is temporally offset to the first time;
   ascertaining a stationary surface in the region of acquisition using the image pair, the stereo base, and a stereoscopy processing rule, to obtain an angle of inclination of the stereo video system;
   determining the stationary surface using the first image of the image pair, the further image, and a correspondence transformation processing rule, to obtain a comparison angle, a correspondence transformation between the first image and the further image being acquired if the stereo video system moved by a distance between the first time and the further time; and
   comparing the angle of inclination with the comparison angle using a comparison rule to recognize the change of the relative yaw angle.

* * * * *